US012487641B2

(12) United States Patent
Chen et al.

(10) Patent No.: US 12,487,641 B2
(45) Date of Patent: Dec. 2, 2025

(54) ELECTRONIC DEVICE, AND CONTROL METHOD AND CONTROL APPARATUS THEREFOR

(71) Applicant: VIVO MOBILE COMMUNICATION CO., LTD., Guangdong (CN)

(72) Inventors: Tao Chen, Guangdong (CN); Lele Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 175 days.

(21) Appl. No.: 18/517,397

(22) Filed: Nov. 22, 2023

(65) Prior Publication Data

US 2024/0085959 A1 Mar. 14, 2024

Related U.S. Application Data

(63) Continuation of application No. PCT/CN2022/097135, filed on Jun. 6, 2022.

(30) Foreign Application Priority Data

Jun. 10, 2021 (CN) .......................... 202110646410.3

(51) Int. Cl.
*G06F 1/16* (2006.01)
*G01S 15/08* (2006.01)
(Continued)

(52) U.S. Cl.
CPC ............ *G06F 1/1652* (2013.01); *G01S 15/08* (2013.01); *G06F 1/1677* (2013.01); *G09F 9/301* (2013.01); *H04M 1/0268* (2013.01)

(58) Field of Classification Search
CPC .......... H04R 2201/40; H04R 2201/401; H04R 2201/403; H04R 2201/405; G06F 1/1652
See application file for complete search history.

(56) References Cited

U.S. PATENT DOCUMENTS 6,101,402 A * 8/2000 Bartha .................. H04M 1/035
379/433.03
6,965,790 B1 * 11/2005 Mendolia ................ H04M 1/03
455/128

(Continued)

FOREIGN PATENT DOCUMENTS

CN 101171621 A 4/2008
CN 106157816 A 11/2016

(Continued)

*Primary Examiner* — Adrian S Wilson
(74) *Attorney, Agent, or Firm* — Price Heneveld LLP

(57) ABSTRACT

This application discloses an electronic device, a control method and control apparatus therefor, and a readable storage medium. The electronic device includes a first housing, a second housing, a flexible display, a sound emitter, a first sound receiver, a second sound receiver, and a third sound receiver. The sound emitter is disposed inside the first housing, and the sound emitter is in communication with the outside via a first sound outlet hole. The first sound receiver is disposed inside the second housing, and the first sound receiver is in communication with the outside via a first sound receiving hole. The second sound receiver and the third sound receiver are both disposed inside the first housing, the second sound receiver is in communication with the outside via a second sound receiving hole, and the third sound receiver is in communication with the outside through a third sound receiving hole.

20 Claims, 11 Drawing Sheets

(51) Int. Cl.
 G09F 9/30 (2006.01)
 H04M 1/02 (2006.01)

(56) References Cited

U.S. PATENT DOCUMENTS

| | | |
|---|---|---|
| 2009/0051830 A1 | 2/2009 | Matsushita et al. |
| 2019/0295403 A1 | 9/2019 | Lin et al. |
| 2019/0297175 A1 | 9/2019 | Lin et al. |
| 2020/0213723 A1 | 7/2020 | Zuo |

FOREIGN PATENT DOCUMENTS

| | | |
|---|---|---|
| CN | 109743445 A | 5/2019 |
| CN | 111370026 A | 7/2020 |
| CN | 111385387 A | 7/2020 |
| CN | 112492070 A | 3/2021 |
| CN | 113422848 A | 9/2021 |

\* cited by examiner

ELECTRONIC DEVICE, AND CONTROL METHOD AND CONTROL APPARATUS THEREFOR

CROSS-REFERENCE TO RELATED APPLICATIONS

The present invention is a Bypass Continuation application of PCT International Application No. PCT/CN2022/097135 filed on Jun. 6, 2022, which claims priority to Chinese Patent Application No. 202110646410.3, filed with the China National Intellectual Property Administration on Jun. 10, 2021 and entitled "ELECTRONIC DEVICE, AND CONTROL METHOD AND CONTROL APPARATUS THEREFOR", which are incorporated herein by reference in their entireties.

TECHNICAL FIELD

This application pertains to the field of communication technologies and specifically relates to an electronic device, a control method and control apparatus therefor, and a readable storage medium.

BACKGROUND

With the development of communication technology, electronic devices are continuously moving towards full-screen designs, with increasingly large displays. Large displays can not only enhance the aesthetics of electronic devices but also provide users with good visual impact. For activities such as gaming, browsing information, or watching movies, a large display can provide good user experience.

To increase screen-to-body ratios and control sizes of electronic devices to facilitate the portability of the electronic devices, rollable flexible displays have been increasingly widely used in the electronic devices. Such flexible display can be rolled in a housing of an electronic device and can also extend out of the housing to be unrolled, so as to provide a large display region. An electronic device further includes sound receivers such as microphones. During unrolling and rolling of a flexible display, the sound receivers remain stationary. Therefore, the rollable characteristic of the flexible display is not fully used in arrangement of such sound receivers, resulting in a low structural utilization of the electronic device.

SUMMARY

According to a first aspect, an embodiment of this application provides an electronic device. The electronic device includes a first housing, a second housing, a flexible display, a sound emitter, a first sound receiver, a second sound receiver, and a third sound receiver, where
  the first housing is connected to the second housing via the flexible display, and the second housing is capable of moving relative to the first housing such that the flexible display switches between a rolled state and an unrolled state;
  the sound emitter is disposed inside the first housing, a first sound outlet hole is provided in a surface of the first housing, and the sound emitter is in communication with the outside via the first sound outlet hole;
  the first sound receiver is disposed inside the second housing, a first sound receiving hole is provided in a surface of the second housing, and the first sound receiver is in communication with the first sound receiving hole; and the second sound receiver and the third sound receiver are both disposed inside the first housing, a second sound receiving hole and a third sound receiving hole are further provided in the surface of the first housing, the second sound receiver is in communication with the outside via the second sound receiving hole, the third sound receiver is in communication with the outside via the third sound receiving hole, and the second sound receiving hole and the third sound receiving hole are respectively located on two sides of the first housing facing away from each other; and
  in a case that the flexible display is in the rolled state, the first housing covers the first sound receiving hole; and in a case that the flexible display is in the unrolled state, the first sound receiving hole is exposed, and the first sound receiver is in communication with the outside via the first sound receiving hole.

According to a second aspect, an embodiment of this application further provides a control method for electronic device. The control method includes:
  controlling a sound emitter to emit sound; and
  obtaining a state parameter of a flexible display based on sound reception signals of a first sound receiver and a second sound receiver.

According to a third aspect, an embodiment of this application further provides a control apparatus for electronic device. The control apparatus includes:
  a control module configured to control a sound emitter to emit sound; and
  a processing module configured to obtain a state parameter of a flexible display based on sound reception signals of a first sound receiver and a second sound receiver.

According to a fourth aspect, an embodiment of this application provides an electronic device, where the electronic device includes a processor, a memory, and a program or instructions stored in the memory and capable of running on the processor, and when the program or instructions are executed by the processor, the steps of the foregoing control method are implemented.

According to a fifth aspect, an embodiment of this application provides a readable storage medium, where the readable storage medium stores a program or instructions, and when the program or instructions are executed by a processor, the steps of the foregoing control method are implemented.

Figure 1:
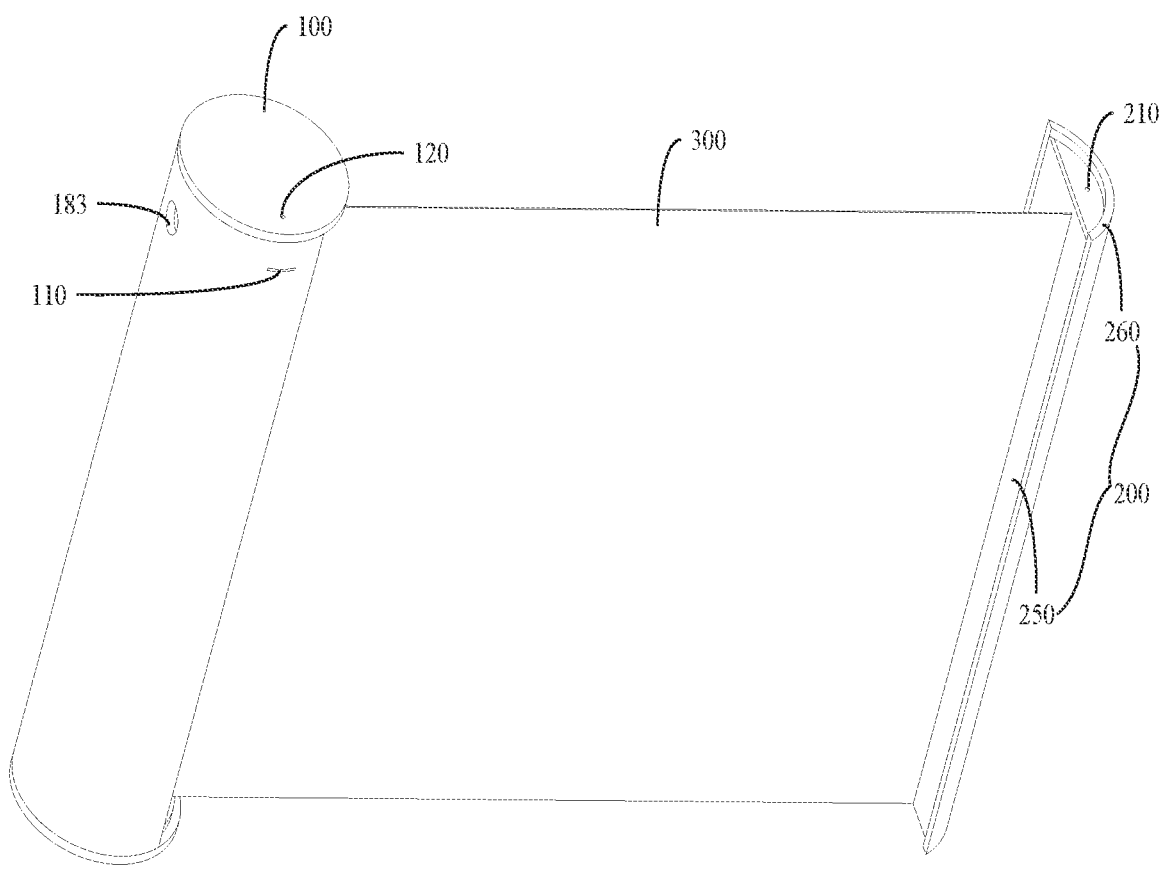
FIG. 1 to FIG. 3 are schematic structural diagrams of an electronic device according to a first embodiment of this application from different perspectives.
Figure 2:
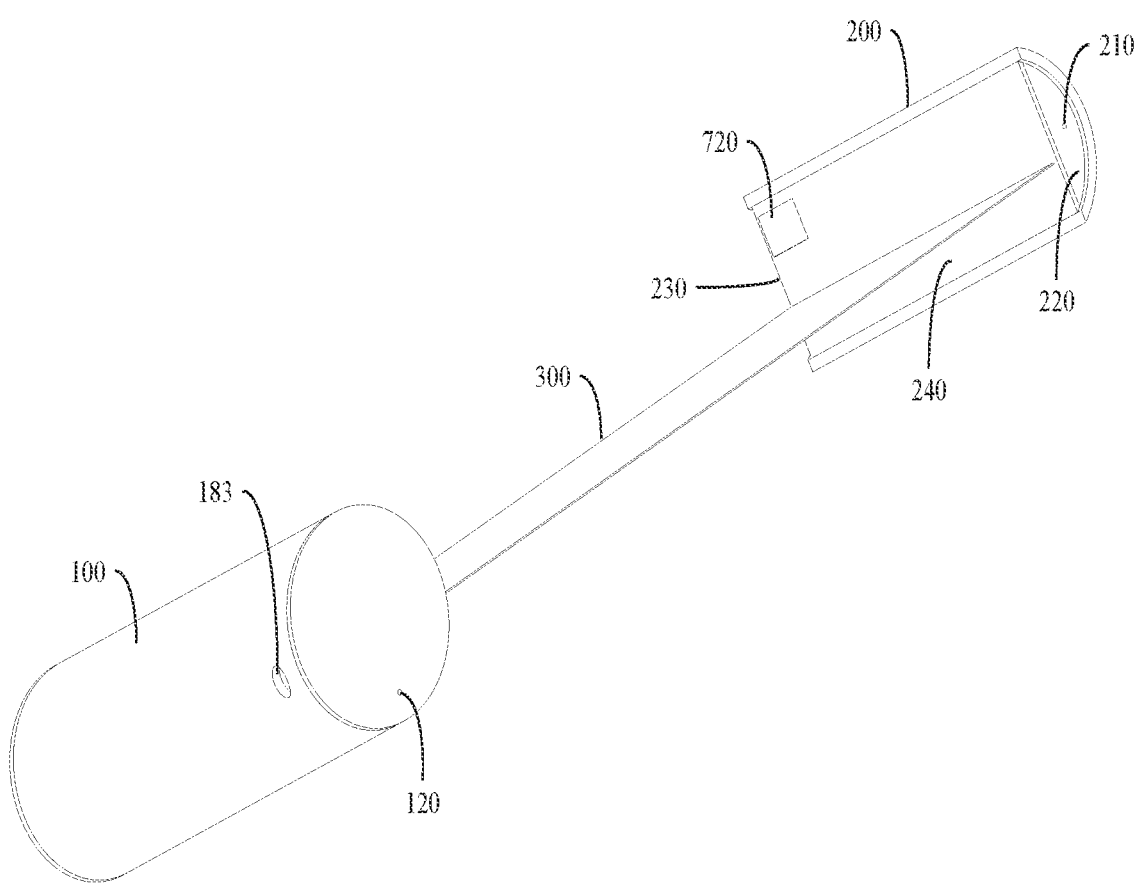
Figure 3:
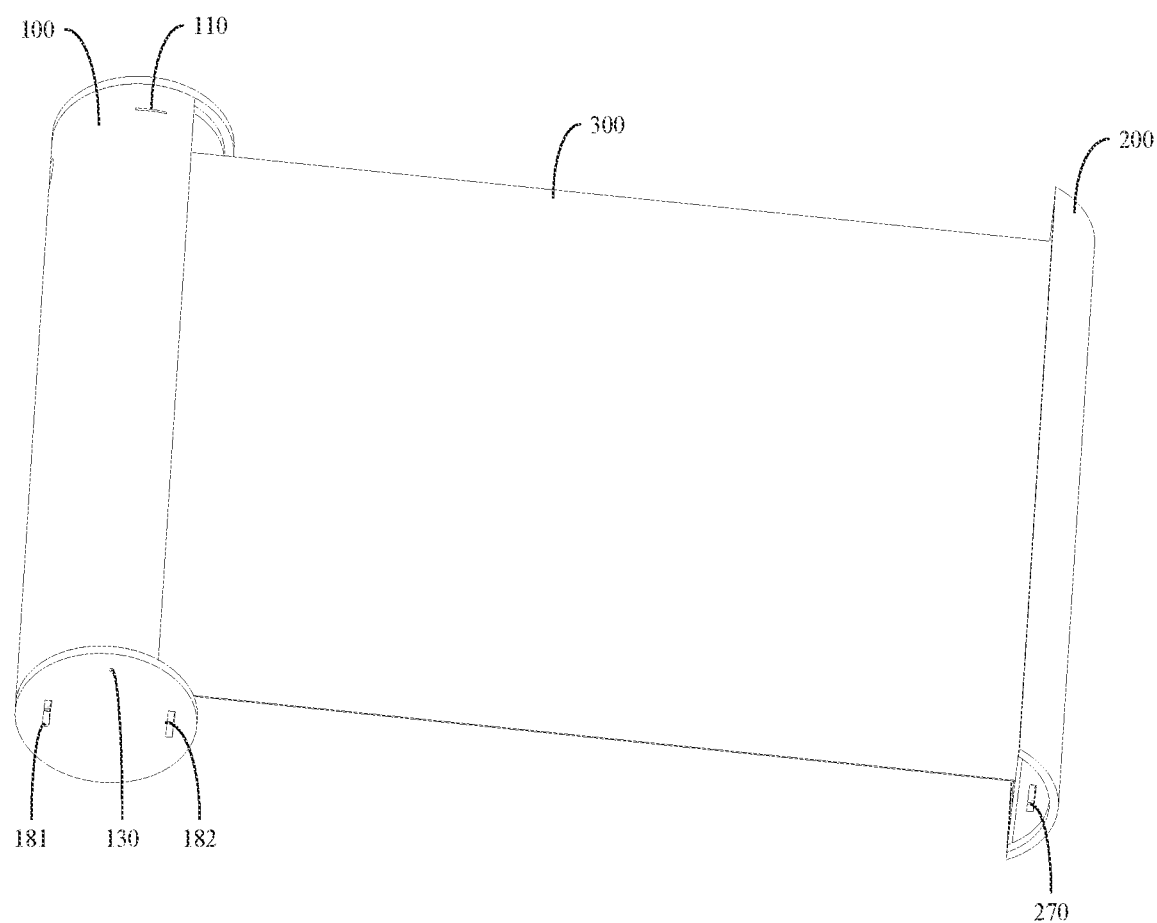
Figure 4:
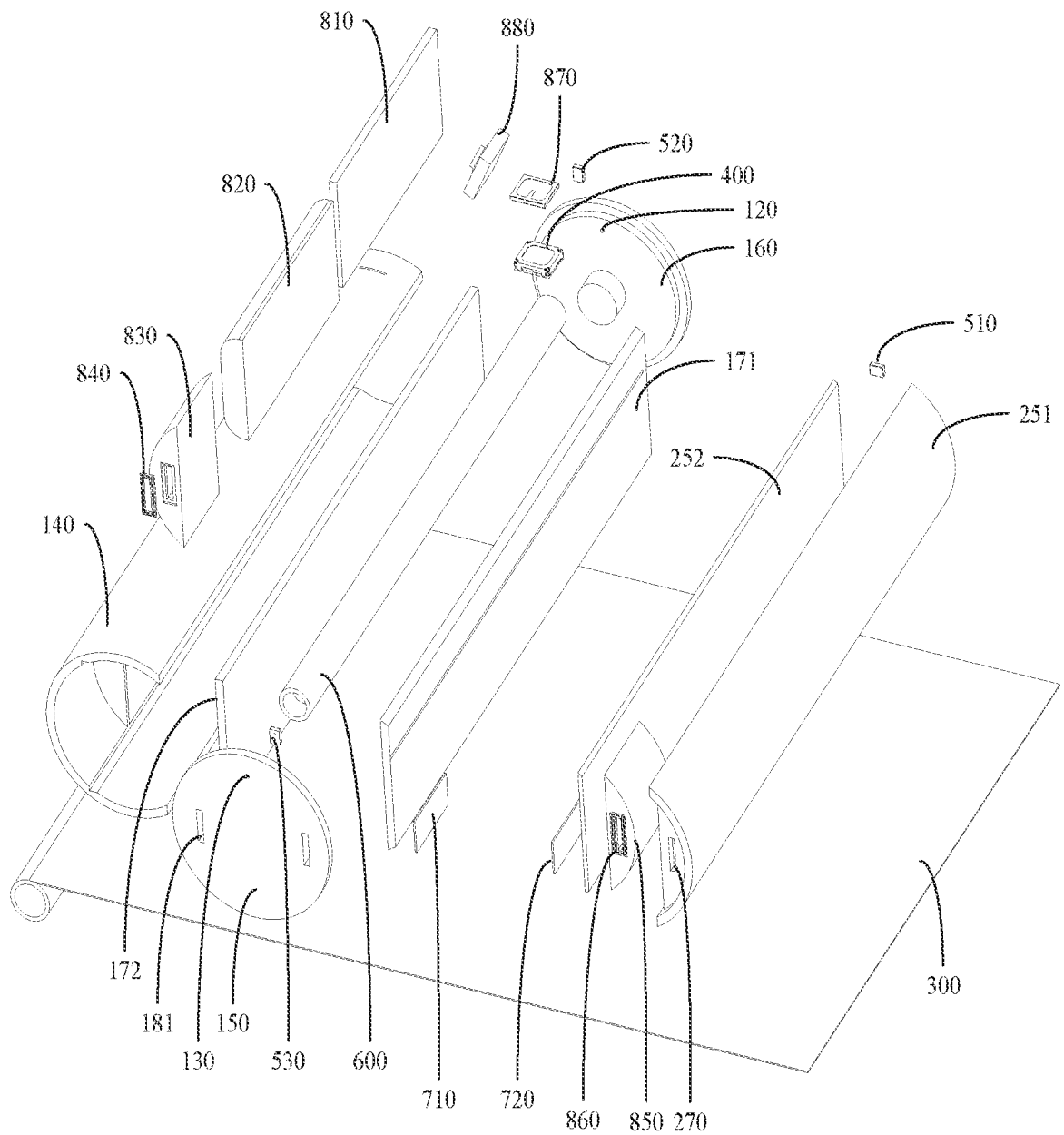
FIG. 4 is an exploded view of the electronic device according to the first embodiment of this application.

DESCRIPTION OF REFERENCE SIGNS 100. first housing; 110. first sound outlet hole; 120. second sound receiving hole; 130. third sound receiving hole; 140. first body portion; 150. first end plate; 160. second end plate; 171. first cover plate; 172. second cover plate; 181. second sound outlet hole; 182, fourth sound outlet hole; 183. light through hole;

200. second housing; 210. first sound receiving hole; 220. first surface; 230. second surface; 240. third surface; 250. housing body; 251. second body portion; 252. third cover plate; 260. protrusion; 270. third sound outlet hole;

300. flexible display;

400. sound emitter;

510. first sound receiver; 520, second sound receiver, 530. third sound receiver;

600. rolling shaft;

710. first magnetic member; 720. second magnetic member;

810. circuit board; 820. battery; 830. first speaker; 840. first sealing member; 850, second speaker; 860. second sealing member; 870, third sealing member; 880, camera; 890, fourth sealing member;

900. electronic device; 901. processor; 910. radio frequency unit; 920. network module; 930. audio output unit; 940. input unit; 941. graphics processing unit; 942. microphone; 950. sensor; 960. display unit; 961. display panel; 970. user input unit; 971. touch panel; 972. other input devices; 980. interface unit; 990. memory; 991. application program; 992. operating system;

1000. electronic device; 1100. processor; and 1200. memory.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application without creative efforts shall fall within the protection scope of this application.

The terms "first", "second", and the like in the specification and claims of this application are used to distinguish between similar objects rather than to describe a specific order or sequence. It should be understood that data used in this way are interchangeable in appropriate circumstances such that the embodiments of this application can be implemented in other orders than the order illustrated or described herein. In addition, in this specification and claims, "and/or" indicates at least one of the connected objects, and the character "I" generally indicates an "or" relationship between the contextually associated objects.

The following describes in detail an electronic device provided in the embodiments of this application through specific embodiments and application scenarios thereof with reference to the accompanying drawings.

Referring to FIG. 1 to FIG. 6, an embodiment of this application provides an electronic device. The electronic device includes a first housing 100, a second housing 200, a flexible display 300, a sound emitter 400, a first sound receiver 510, a second sound receiver 520, and a third sound receiver 530.

The first housing 100 is connected to the second housing 200 via the flexible display 300. The second housing 200 can move relative to the first housing 100 such that the flexible display 300 switches between a rolled state and an unrolled state. Optionally, the first housing 100 and the second housing 200 may not be directly connected. One end of the flexible display 300 is connected to the first housing 100, and the other end of the flexible display 300 is connected to the second housing 200. A user can manually apply an action force to either the first housing 100 or the second housing 200, or to both the first housing 100 and the second housing 200, allowing the second housing 200 to leave or approach the first housing 100, so that the flexible display 300 switches between the rolled state and the unrolled state, thereby changing a size of a portion located outside both the first housing 100 and the second housing 200 in the flexible display 300 to change a size of a display region of the electronic device and an overall size of the electronic device. To facilitate rolling of the flexible display 300, a rolling shaft 600 may be disposed inside the first housing 100, and one end of the flexible display 300 is rolled around the rolling shaft 600. When the flexible display 300 switches between the rolled state and the unrolled state, the flexible display 300 may be gradually rolled around the rolling shaft 600 or gradually separated from the rolling shaft 600.

The sound emitter 400 is disposed inside the first housing 100, and a first sound outlet hole 110 is provided in a surface of the first housing 100. The sound emitter 400 is in communication with the outside via the first sound outlet hole 110, and sound emitted by the sound emitter 400 may be transmitted to the outside via the first sound outlet hole 110. Optionally, sound waves emitted by the sound emitter 400 may be audible sound, in which case all of the first sound receiver 510, the second sound receiver 520, and the third sound receiver 530 are components capable of receiving audible sound. Alternatively, sound waves emitted by the sound emitter 400 may be ultrasonic waves, and correspondingly, all of the first sound receiver 510, the second sound receiver 520, and the third sound receiver 530 are components capable of receiving ultrasonic waves. Certainly, the sound emitter 400 may alternatively be a component capable of emitting both audible sound and ultrasonic waves, and correspondingly, all of the first sound receiver 510, the second sound receiver 520, and the third sound receiver 530 are components capable of receiving both audible sound and ultrasonic waves. Comparatively, when the sound waves emitted by the sound emitter 400 are ultrasonic waves, the user cannot hear the sound emitted by the sound emitter 400 during operation of the sound emitter 400, which can provide good user experience. Therefore, the sound emitter 400 can be designated as an ultrasonic emitter. Optionally, the sound emitter 400 may be a receiver, and the first sound receiver 510, the second sound receiver 520, and the third sound receiver 530 may all be microphones, which can make full use of the existing components of the electronic device, thereby reducing the cost and component stacking complexity of the electronic device.

The first sound receiver 510 is disposed inside the second housing 200, a first sound receiving hole 210 is provided in a surface of the second housing 200, and the first sound receiver 510 is in communication with the first sound receiving hole 210. In a case that the flexible display 300 is in the rolled state, the first housing 100 covers the first sound receiving hole 210, in which case the first sound receiving hole 210 cannot be in communication with the outside, and therefore the first sound receiver 510 cannot receive sound. In a case that the flexible display 300 is in the unrolled state, the first sound receiving hole 210 is exposed, and the first sound receiver 510 is in communication with the outside via the first sound receiving hole 210 and thus can receive the sound. In other words, the state of the first sound receiving hole 210 changes with the state of the flexible display 300, thereby changing the operation state of the first sound receiver 510.

The second sound receiver 520 and the third sound receiver 530 are both disposed inside the first housing 100. A second sound receiving hole 120 and a third sound receiving hole 130 are provided in the surface of the first housing 100, where the second sound receiver 520 is in communication with the outside via the second sound receiving hole 120, the third sound receiver 530 is in communication with the outside via the third sound receiving hole 130, and the second sound receiving hole 120 and the third sound receiving hole 130 are respectively located on two sides of the first housing 100 facing away from each other. The second sound receiving hole 120 and the third sound receiving hole 130 are always in communication with the outside. Therefore, regardless of changes in the state of the flexible display 300, the second sound receiver 520 and the third sound receiver 530 can always receive sound. In the case that the flexible display 300 is in the rolled state, functions such as recording can be implemented by the second sound receiver 520 and the third sound receiver 530.

In this embodiment of this application, the flexible display 300 can switch between the rolled state and the unrolled state. When the flexible display 300 is in the rolled state, the first housing 100 covers the first sound receiving hole 210, allowing the sound emitted by the sound emitter 400 to be picked up by the second sound receiver 520 but not the first sound receiver 510. When the flexible display 300 is in the unrolled state, the first sound receiving hole 210 is exposed, allowing the sound emitted by the sound emitter 400 to be picked up by both the first sound receiver 510 and the second sound receiver 520. The state of the flexible display 300 and a position of the first sound receiver 510 can be determined by detecting whether the first sound receiver 510 picks up a sound signal and based on parameters of the sound signals picked up by the first sound receiver 510 and the second sound receiver 520. With this solution, the first sound receiver 510 can move with the second housing 200, allowing the position of the first sound receiver 510 to change, and implementing functions such as directional recording based on this. It can be seen that this embodiment can make full use of the rollable characteristic of the flexible display 300, thereby implementing more functions and achieving a higher structural utilization of the electronic device. In addition, the state of the flexible display 300 can be determined using the first sound receiver 510 and the second sound receiver 520. Therefore, there is no need to provide additional components to detect the state of the flexible display 300, which indicates that this solution can also reduce the cost and component stacking complexity of the electronic device.

In an optional embodiment, the second housing 200 has a first surface 220 and a second surface 230, the first surface 220 and the second surface 230 facing away from each other in a direction parallel to the rolling shaft 600, and the first surface 220 being provided with the first sound receiving hole 210. In other words, the first sound receiving hole 210 may be provided in an end face of the second housing 200. To cover the first sound receiving hole 210 when the flexible display 300 is in the rolled state, the first housing 100 may be provided with an outward extension portion. When the flexible display 300 is in the rolled state, the outward extension portion is located on an outer side of the second housing 200 to cover the first sound receiving hole 210. In this embodiment, since the outward extension portion of the first housing 100 has a specified size, during gradual rolling of the flexible display 300, when an edge of the outward extension portion reaches the position of the first sound receiving hole 210, with the second housing 200 further gradually approaching the first housing 100, the outward extension portion can maintain a state of shielding the first sound receiving hole 210 for a period of time until the second housing 200 no longer approaches the first housing 100. Conversely, during gradual unrolling of the flexible display 300, when the second housing 200 starts leaving the first housing 100, the outward extension portion can maintain the state of shielding the first sound receiving hole 210 for a period of time until the outward extension portion does not shield the first sound receiving hole 210 at all. Then the second housing 200 can continue to leave the first housing 100. It can be seen that this embodiment can allow the first housing 100 to shield the first sound receiving hole 210 for a long time, thereby enhancing the shielding effect of the first sound receiving hole 210.

In another optional embodiment, as shown in FIG. 7 to FIG. 10, the second housing 200 has a third surface 240, the third surface 240 being provided with the first sound receiving hole 210; and in a case that the flexible display 300 is in the unrolled state, the third surface 240 faces the first housing 100. With such arrangement, the first sound receiving hole 210 is provided at a position of the second housing 200 closer to the sound emitter 400, so that the first sound receiver 510 can more easily pick up sound signals emitted by the sound emitter 400. Therefore, this embodiment can enhance the sensitivity of the first sound receiver 510.

Two ends of the first housing 100 in the direction parallel to the rolling shaft 600 are a first end and a second end, and two ends of the second housing 200 in the direction parallel to the rolling shaft 600 are a third end and a fourth end, the first end and the third end being located on a same side, and the second end and the fourth end being located on a same side. Optionally, the first sound outlet hole 110 is provided in the first end, and the first sound receiving hole 210 is provided in the fourth end, that is, the first sound outlet hole 110 and the first sound receiving hole 210 are provided in different sides of the electronic device. Alternatively, the first sound outlet hole 110 is provided in the first end, and the first sound receiving hole 210 is provided in the third end, that is, the first sound outlet hole 110 and the first sound receiving hole 210 are provided in a same side of the electronic device. Comparatively, in the latter embodiment, a shorter distance is present between the first sound outlet hole 110 and the first sound receiving hole 210, which is more conducive to picking up clearer sound signals by the first sound receiver 510.

In the optional embodiment, the second housing 200 includes a housing body 250 and a protrusion 260, where the protrusion 260 is disposed at an end of the housing body 250, the end is provided with the first sound receiving hole 210, and the protrusion 260 protrudes relative to the first sound receiving hole 210. In the case that the flexible display 300 is in the unrolled state, the first sound receiving hole 210 is located between the first housing 100 and the protrusion 260. The protrusion 260 here can simulate the user's ear, which is more conducive to distinguishing directions of sound signals, thereby determining sound directions more accurately to improve the recording effect.

Optionally, the first housing 100 may include a first body portion 140, a first end plate 150, a second end plate 160, a first cover plate 171, and a second cover plate 172. The first body portion 140 may be a cylindrical structure. The first end plate 150 and the second end plate 160 are respectively disposed at two ends of the first body portion 140. The first cover plate 171 is disposed inside the first body portion 140. A circuit board 810, a battery 820, a first speaker 830, and a camera 880 may be disposed inside a space enclosed by the first cover plate 171 and the first body portion 140. A second sound outlet hole 181 is formed in the first end plate 150, and the first speaker 830 may be in communication with the outside via the second sound outlet hole 181. The first body portion 140 is provided with a light through hole 183, and the camera 880 is positioned opposite to the light through hole 183. The second cover plate 172 is disposed inside the first body portion 140, and the sound emitter 400, the second sound receiver 520, the third sound receiver 530, and the rolling shaft 600 may be disposed inside a space between the first cover plate 171 and the second cover plate 172. In the case that the flexible display 300 is in the rolled state, the second housing 200 and the first housing 100 together form a cylindrical structure, helping a user to roll the electronic device. The housing body 250 of the second housing 200 may include a second body portion 251 and a third cover plate 252, where the second body portion 251 may be a cylindrical structure, the third cover plate 252 is connected to the second body portion 251, and the first sound receiver 510 and a second speaker 850 are disposed inside a space enclosed by the second body portion 251 and the third cover plate 252. The first housing 100 is further provided with a fourth sound outlet hole 182, and the second body portion 251 is provided with a third sound outlet hole 270. In the case that the flexible display 300 is in the rolled state, the third sound outlet hole 270 faces the fourth sound outlet hole 182, and the second speaker 850 is in communication with the outside via the third sound outlet hole 270 and the fourth sound outlet hole 182. In the case that the flexible display 300 is in the unrolled state, the second speaker 850 is in communication with the outside via only the third sound outlet hole 270.

In addition, a first sealing member 840 may be disposed at the second sound outlet hole 181, and the first speaker 830 may be in hermetical communication with the second sound outlet hole 181 via the first sealing member 840. A second sealing member 860 may be disposed at the third sound outlet hole 270, and the second speaker 850 may be in hermetical communication with the third sound outlet hole 270 via the second sealing member 860. A third sealing member 870 may be disposed at the first sound outlet hole 110, and the sound emitter 400 may be in hermetical communication with the first sound outlet hole 110 via the third sealing member 870. When the third surface 240 of the second housing 200 is provided with the first sound receiving hole 210, a fourth sealing member 890 may be disposed on an outer surface of the first housing 100 (specifically, the first cover plate 171). In the case that the flexible display 300 is in the rolled state, the fourth sealing member 890 blocks the first sound receiving hole 210 to seal the first sound receiving hole 210.

Further, the electronic device further includes a first magnetic member 710 and a second magnetic member 720. Optionally, both the first magnetic member 710 and the second magnetic member 720 may be magnets. The first magnetic member 710 is disposed on the first housing 100, and the second magnetic member 720 is disposed on the second housing 200. In the case that the flexible display 300 is in the rolled state, the first magnetic member 710 is in magnetic attraction with the second magnetic member 720, making it difficult for the first housing 100 and the second housing 200 to separate, thereby keeping the flexible display 300 in the rolled state more reliably. Still further, the first magnetic member 710 is disposed on a surface of the first housing 100 facing the second housing 200, and the second magnetic member 720 is disposed on a surface of the second housing 200 facing the first housing 100. When the flexible display 300 is in the rolled state, a shorter distance is present between the first magnetic member 710 and the second magnetic member 720 such that the two magnetic members can be in direct contact with each other, which forms a greater action force between the two magnetic members, thereby improving the reliability of keeping the flexible display 300 in the rolled state.

Based on the electronic device disclosed in any of the foregoing embodiments, an embodiment of this application further discloses a control method for electronic device. The control method includes the following steps.

S100. Control a sound emitter 400 to emit sound.

S200. Obtain a state parameter of a flexible display 300 based on sound reception signals of a first sound receiver 510 and a second sound receiver 520.

After the sound emitter 400 emits a sound, since a second sound receiving hole 120 is always in communication with the outside, the second sound receiver 520 can always receive sound signals emitted by the sound emitter 400. For the first sound receiver 510, when the flexible display 300 is in a rolled state, a first sound receiving hole 210 is covered, so the first sound receiver 510 cannot receive the sound signals. When the flexible display 300 is in an unrolled state, the first sound receiving hole 210 is in communication with the outside, so the first sound receiver 510 can receive the sound signals emitted by the sound emitter 400. In addition, during continuous unrolling of the flexible display 300, a second housing 200 reflects some sound waves emitted by the sound emitter 400 to the second sound receiver 520, causing changes in the sound signals received by the second sound receiver 520. Therefore, combining the sound reception signals of the first sound receiver 510 and the second sound receiver 520 can accurately determine the state parameter of the flexible display 300, facilitating the implementation of functions such as directional recording.

Optionally, the foregoing state parameter may include unrolling distance, where the unrolling distance refers to a length variation of the flexible display 300 during unrolling of the flexible display 300 and also represents a movement distance of the second housing 200. Since the first sound receiver 510 is provided on the second housing 200, the first sound receiver 510 is related to the unrolling distance. Obtaining the unrolling distance can determine a position of the first sound receiver 510, facilitating the implementation of functions such as directional recording. Based on this, step S200 specifically includes the following steps.

S210. Obtain a current state of the flexible display 300 based on intensity of a first sound reception signal received by the first sound receiver 510 and intensity of a second sound reception signal received by the second sound receiver 520.

Figure 5:
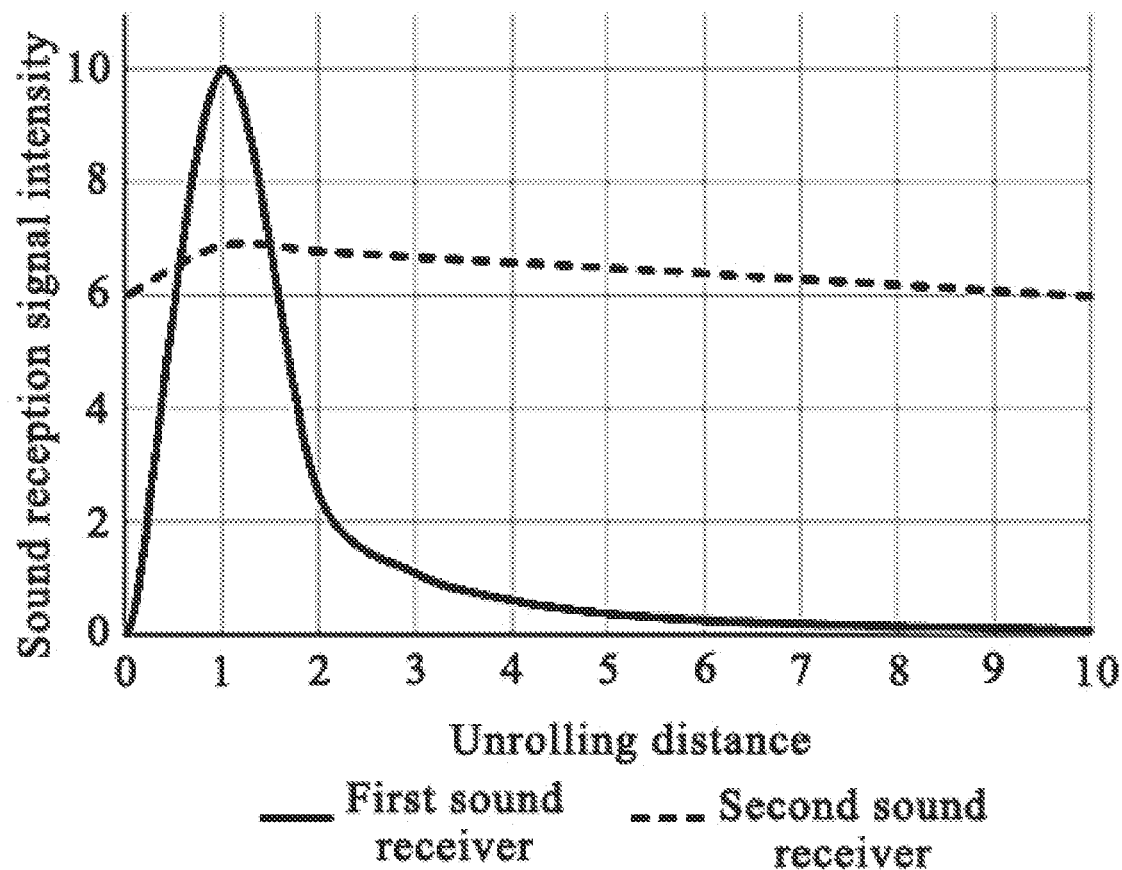
FIG. 5 is a diagram showing a relationship between sound reception signal intensities received by a first sound receiver and a second sound receiver and unrolling distance during unrolling of the flexible display according to the first embodiment of this application.

The current state of the flexible display 300 here may include the unrolled state and the rolled state. As shown in FIG. 5, it should be noted that the unrolling distance in FIG. 5 is measured in cm, and the sound reception signal intensity is measured in dB. When the flexible display 300 is in the rolled state, the unrolling distance is 0, the first sound receiver 510 is shielded by the first housing 100, and the first sound receiver 510 cannot receive sound signals; and the intensity of the first sound reception signal is 0, and the second sound receiver 520 receives sound signals with constant intensity. In this case, the intensity of the second sound reception signal is a non-zero fixed value. As the flexible display 300 is continuously unrolled, the unrolling distance gradually increases. The first sound receiving hole 210 undergoes a state from completely blocked to partially blocked and then completely unblocked. During this process, the intensity of the first sound reception signal quickly increases and reaches its maximum value. Due to the reflection of the second housing 200, the sound signals picked up by the second sound receiver 520 are also enhanced to some extent. Then, with an increasingly large unrolling distance of the second housing 200, an increasingly large distance is present between the first sound receiver 510 and the sound emitter 400, the intensity of the first sound reception signal attenuates inversely proportional to the square of the unrolling distance, and the reflection effect of the second housing 200 on the sound signals is increasingly weak, gradually restoring the intensity of the second sound reception signal to its initial value.

S220. When the current state of the flexible display 300 is the unrolled state, obtain corresponding unrolling distances based on the intensity of the first sound reception signal and the intensity of the second sound reception signal.

As described above, when the flexible display 300 is in the unrolled state, the unrolling distance of the flexible display 300 is related to both the intensity of the first sound reception signal and the intensity of the second sound reception signal. Therefore, the unrolling distance of the flexible display 300 can be obtained based on the intensity of the first sound reception signal and the intensity of the second sound reception signal, thereby obtaining the position of the first sound receiver 510. In this embodiment, the intensity of the first sound reception signal and the intensity of the second sound reception signal can be easily detected, and the intensity of the first sound reception signal and the intensity of the second sound reception signal each have a clear relationship with the unrolling distance. Therefore, this embodiment can more accurately obtain the position of the first sound receiver 510.

It can be seen from FIG. 5 that the intensity of the first sound reception signal and the intensity of the second sound reception signal are related to but not in a monotonic function relationship with the unrolling distance of the flexible display 300. Therefore, there are still some limitations in obtaining the unrolling distance of the flexible display 300 based on only the intensity of the first sound reception signal and the intensity of the second sound reception signal. In view of this, to more accurately obtain the unrolling distance of the flexible display 300, step S220 of obtaining corresponding unrolling distances based on the intensity of the first sound reception signal and the intensity of the second sound reception signal specifically includes the following steps.

S221. Measure a duration required for the first sound receiver 510 to pick up a sound signal emitted by the sound emitter 400.

S222. Obtain corresponding unrolling distances based on the duration, the intensity of the first sound reception signal, and the intensity of the second sound reception signal.

The sound signal emitted by the sound emitter 400 propagates to the first sound receiver 510 after a certain period of time. A propagation distance of the sound signal is basically equal to the unrolling distance of the flexible display 300, and the propagation distance of the sound signal is directly proportional to the duration. In addition, due to a limitation on an audio sampling rate, taking an audio sampling rate of 96K as an example, a corresponding sampling period is approximately 10.4 µs, and a corresponding propagation distance is 0.35 cm, that is, a distance resolution is only 0.35 cm. Therefore, if the unrolling distance of the flexible display 300 is determined based on only the duration required for the first sound receiver 510 to pick up the sound signal emitted by the sound emitter 400, there is still a problem of low accuracy. On the contrary, if the unrolling distance of the flexible display 300 is obtained based on all of the duration, the intensity of the first sound reception signal, and the intensity of the second sound reception signal, the unrolling distance of the flexible display 300 can be obtained more accurately.

Optionally, the corresponding unrolling distances can be first determined based on the intensity of the first sound reception signal and the intensity of the second sound reception signal. Then, when there are two values for the unrolling distance, calculation may be further performed based on the duration to further determine the unrolling distance. In another optional embodiment, step S222 specifically includes the following steps.

S2221. Obtain an estimated unrolling distance based on the duration.

S2222. Obtain, based on the estimated unrolling distance, a monotonic interval in which the intensity of the first sound reception signal and the intensity of the second sound reception signal are located.

S2223. Obtain, based on the intensity of the first sound reception signal and the intensity of the second sound reception signal, corresponding unrolling distances for the two intensities in the monotonic interval.

To be specific, after the sound signal is emitted by the sound emitter 400, the duration required for the first sound receiver 510 to pick up the sound signal is recorded. The estimated unrolling distance is calculated based on the duration and a propagation speed of the sound signal. Then, a monotonic interval corresponding to the estimated unrolling distance is looked up in a relationship table of the intensity of the first sound reception signal, the intensity of the second sound reception signal, and the unrolling distance. Further, based on the intensity of the first sound reception signal and the intensity of the second sound reception signal, the corresponding unrolling distances for the two intensities in the monotonic interval are obtained, thereby calibrating the unrolling distance to obtain a more accurate unrolling distance. The control method can simplify control procedures to more quickly and more accurately obtain the unrolling distance of the flexible display 300.

The control method can obtain the unrolling distance of the flexible display 300. The unrolling distance can be used to control states of other components of the electronic device. These components may include the flexible display 300, a camera, a first speaker 830, a second speaker 850, and the like. In an optional embodiment, the unrolling distance of the flexible display 300 can be used to implement directional recording. In this case, the control method further includes the following step.

S300. Match a corresponding directional recording parameter based on the unrolling distance.

In other words, after the unrolling distance of the flexible display 300 is obtained, the corresponding directional recording parameter can be further matched based on the unrolling distance, allowing the electronic device to implement directional recording by using the first sound receiver 510, the second sound receiver 520, and the third sound receiver 530, thereby improving the recording effect of the electronic device.

In another embodiment, step S200 specifically includes the following steps.

S230. Obtain a current state of the flexible display 300 based on intensity of a first sound reception signal received by the first sound receiver 510 and intensity of a second sound reception signal received by the second sound receiver 520.

S240. In a case that the current state of the flexible display 300 is a rolled state, performing operations corresponding to the rolled state.

Figure 6:
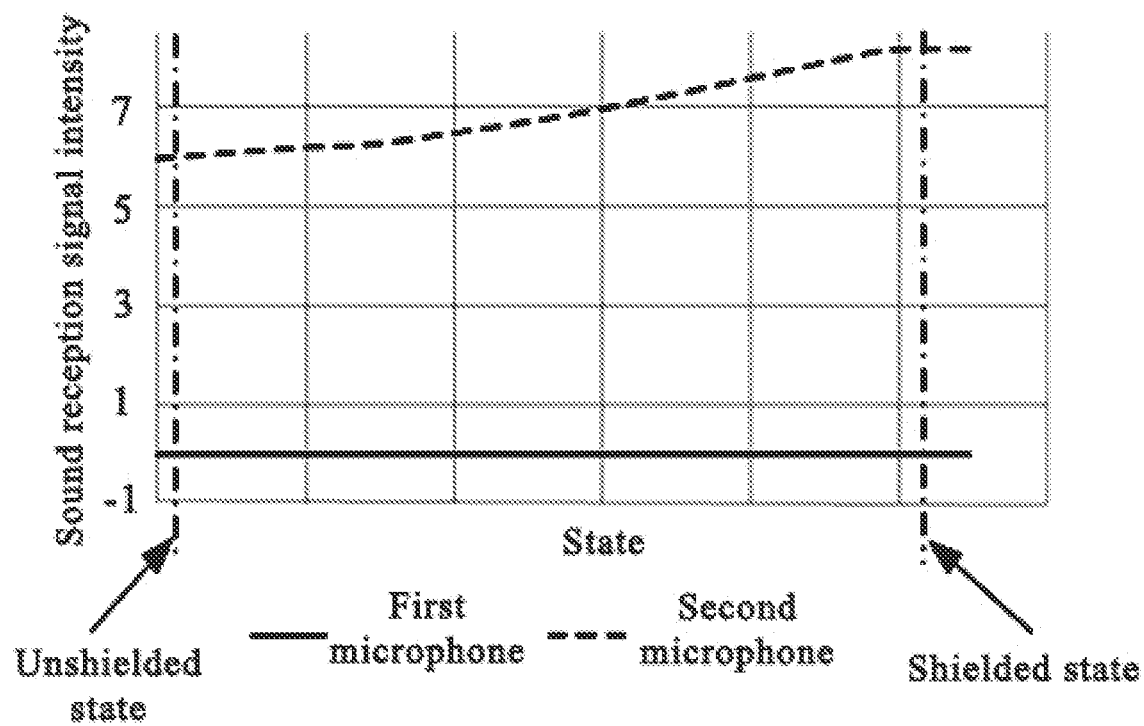
FIG. 6 is a diagram showing variations of sound reception signal intensities received by a first sound receiver and a second sound receiver when the electronic device according to the first embodiment is shielded by a foreign object.
Figure 7:
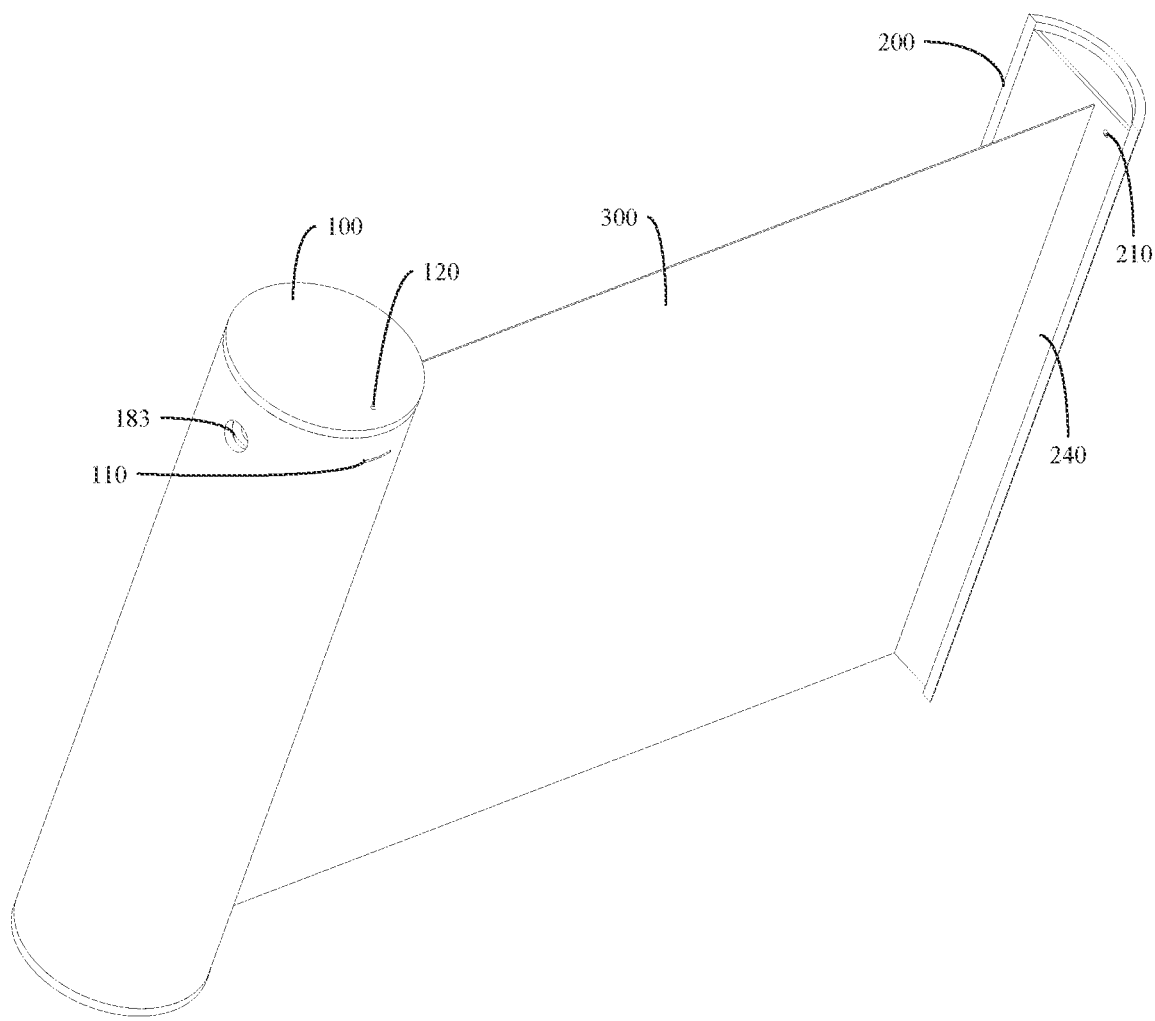
FIG. 7 to FIG. 9 are schematic structural diagrams of an electronic device according to a second embodiment of this application from different perspectives.
Figure 8:
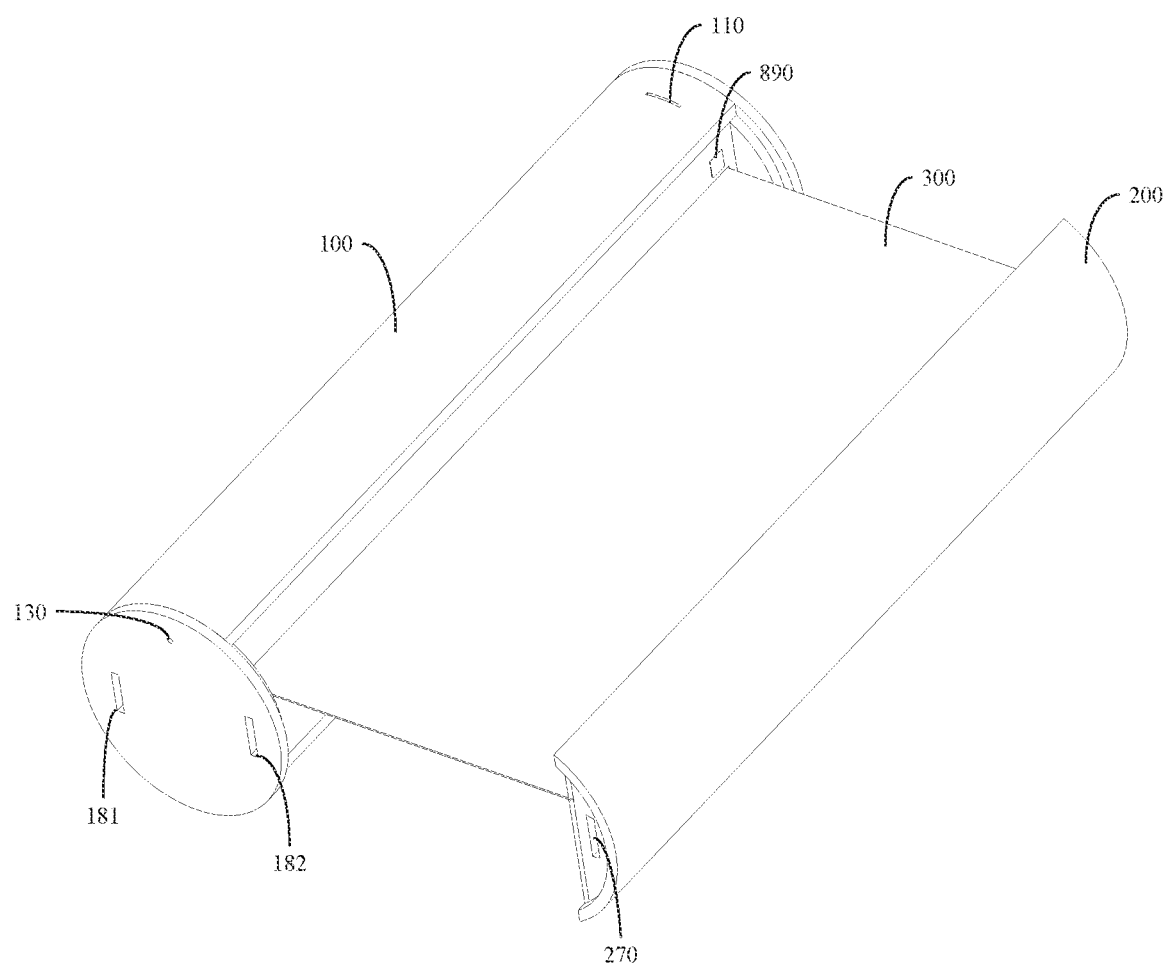
Figure 9:
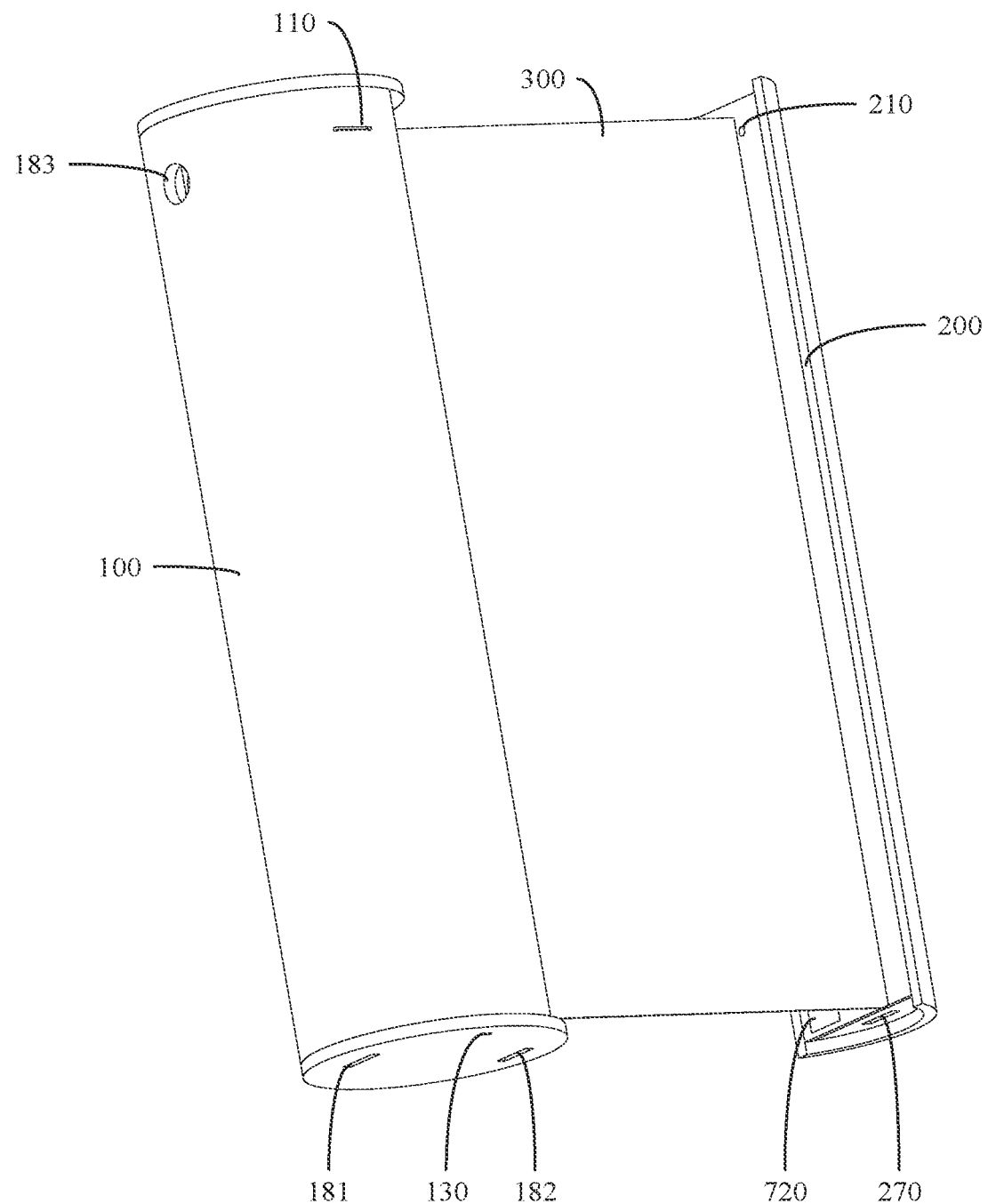
Figure 10:
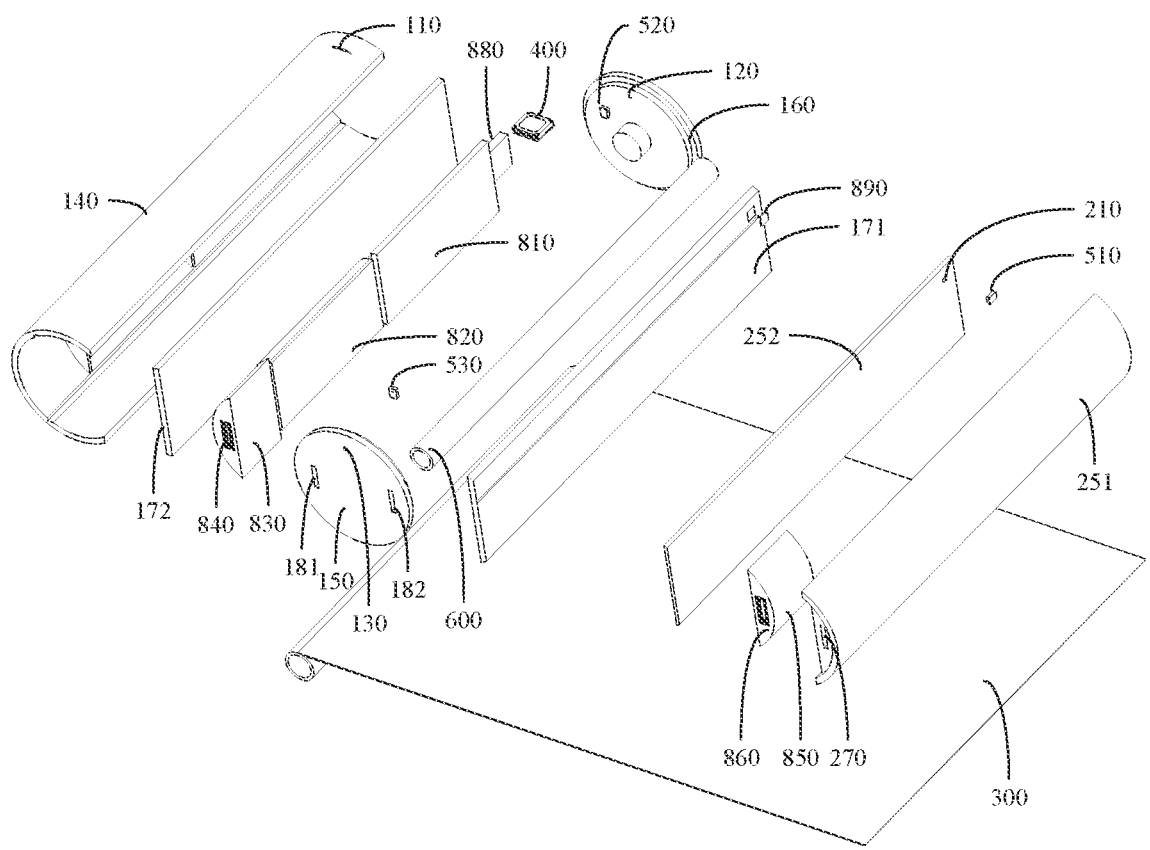
FIG. 10 is an exploded view of the electronic device according to the second embodiment of this application.

As shown in FIG. 6, it should be noted that the state in FIG. 6 is a state indicating whether the electronic device is shielded by a foreign object, and the sound reception signal intensity is measured in dB. When the flexible display 300 is in the rolled state, the first sound receiving hole 210 is shielded by the first housing 100, so the intensity of the first sound reception signal is always 0. If there is a foreign object around the electronic device, for example, when the electronic device is placed in a pocket, with an increasingly large shielding degree, some sound signals emitted by the sound emitter 400 are reflected by the foreign object to the second sound receiving hole 120, resulting in an increase in the intensity of the second sound reception signal. Therefore, proximity test can be performed based on the intensity of the first sound reception signal and the intensity of the second sound reception signal, allowing the electronic device to perform the operations corresponding to the rolled state, for example, retracting the camera and turning off the speaker.

Based on the control method disclosed in any of the foregoing embodiments, an embodiment of this application further discloses a control apparatus for electronic device. The control apparatus includes:

a control module configured to control a sound emitter 400 to emit sound; and a processing module configured to obtain a state parameter of a flexible display 300 based on sound reception signals of a first sound receiver 510 and a second sound receiver 520.

The control apparatus can combine the sound reception signals of the first sound receiver 510 and the second sound receiver 520 to accurately determine the state parameter of the flexible display 300, facilitating the implementation of functions such as directional recording.

The control apparatus in this embodiment of this application may be an apparatus or a component, integrated circuit, or chip in a terminal. The apparatus may be a mobile electronic device or a non-mobile electronic device. For example, the mobile electronic device may be a mobile phone, a tablet computer, a notebook computer, a palmtop computer, a vehicular electronic device, a wearable device, an ultra-mobile personal computer (UMPC), a netbook, a personal digital assistant (PDA), or the like; and the non-mobile electronic device may be a server, a network attached storage (NAS), a personal computer (PC), a television (TV), a teller machine, a self-service machine, or the like. This is not specifically limited in this embodiment of this application.

The control apparatus in this embodiment of this application may be an apparatus having an operating system. The operating system may be an android operating system, may be an iOS operating system, or may be another possible operating system. This is not specifically limited in this embodiment of this application.

Figure 11:
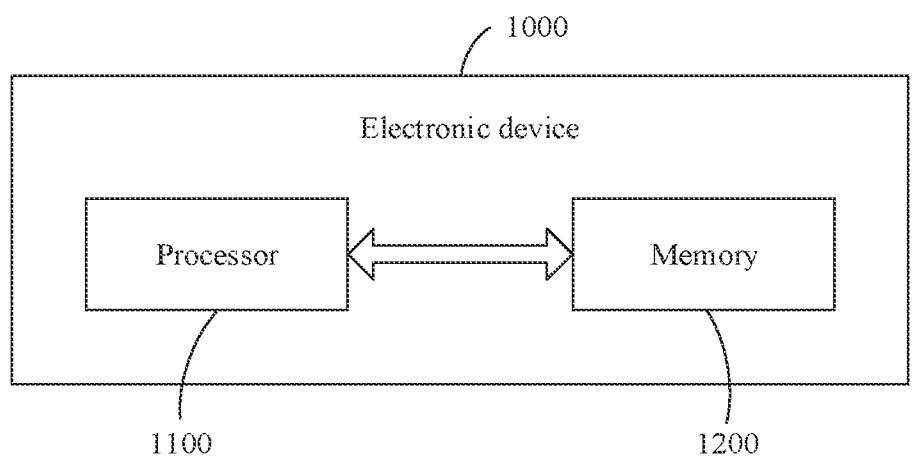
FIG. 11 is a structural block diagram of an electronic device according to an embodiment of this application.

Optionally, as shown in FIG. 11, an embodiment of this application further provides an electronic device 1000 including a processor 1100, a memory 1200, and a program or instructions stored in the memory 1200 and capable of running on the processor 1100, where when the program or instructions are executed by the processor 1100, the processes of the foregoing control method are implemented, with the same technical effects achieved. To avoid repetition, details are not further described herein.

Figure 12:
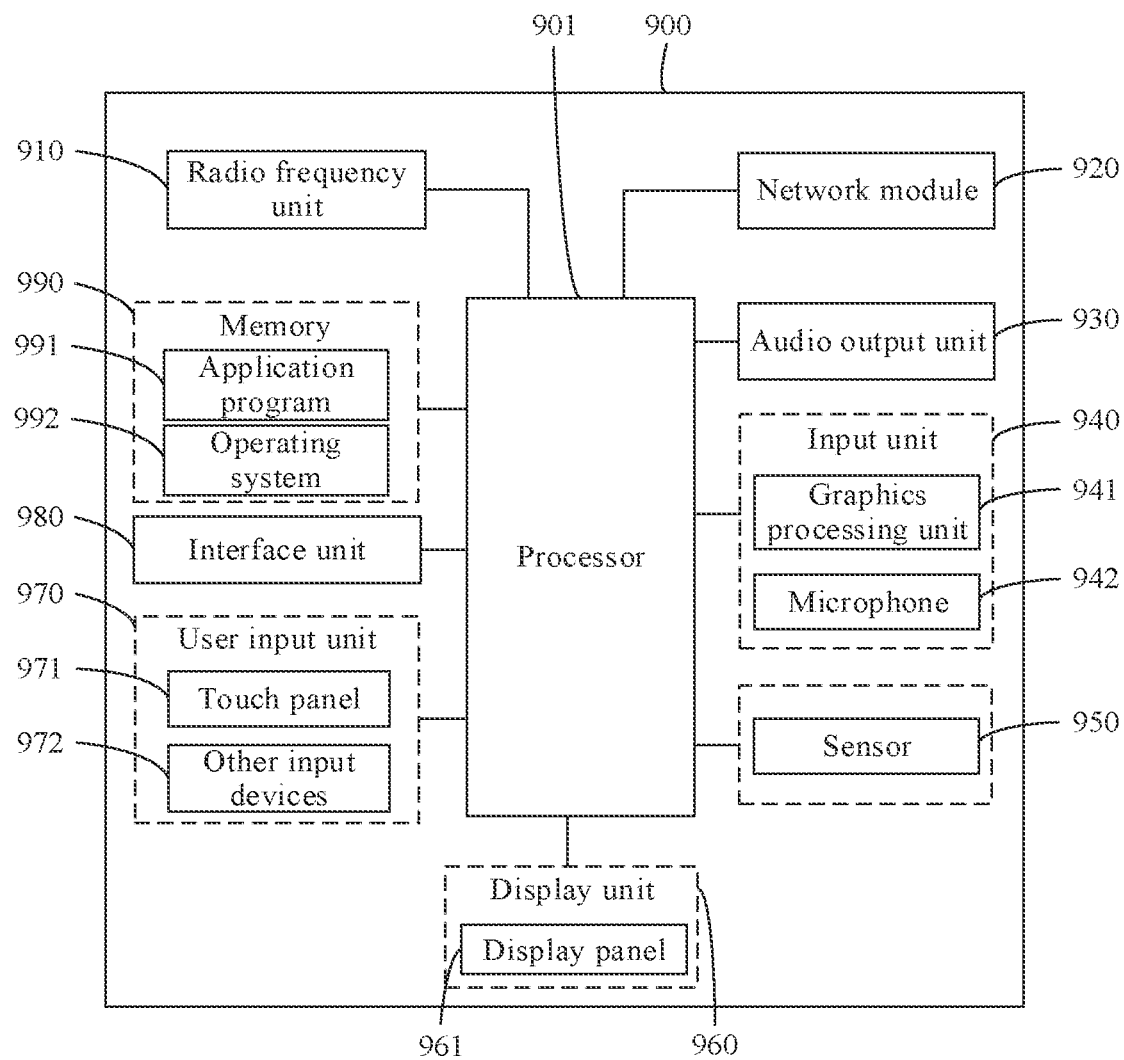
FIG. 12 is a schematic diagram of a hardware structure of an electronic device according to an embodiment of this application.

FIG. 12 is a schematic diagram of a hardware structure of an electronic device according to an embodiment of this application.

The electronic device 900 includes but is not limited to components such as a radio frequency unit 910, a network module 920, an audio output unit 930, an input unit 940, a sensor 950, a display unit 960, a user input unit 970, an interface unit 980, a memory 990, and a processor 901.

It can be understood by persons skilled in the art that the electronic device 900 may further include a power supply (for example, a battery) supplying power to the components. The power supply may be logically connected to the processor 901 via a power management system, so that functions such as charge management, discharge management, and power consumption management are implemented via the power management system. The structure of the electronic device shown in FIG. 12 does not constitute a limitation on the electronic device. The electronic device may include more or fewer components than shown in the drawing, or combine some of the components, or arrange the components differently. Details are not described herein.

The processor 901 is configured to control the sound emitter 400 to emit sound and obtain a state parameter of a flexible display 300 based on sound reception signals of a first sound receiver 510 and a second sound receiver 520, so that the sound reception signals of the first sound receiver 510 and the second sound receiver 520 can be combined to accurately determine the state parameter of the flexible display 300, thereby facilitating the implementation of functions such as directional recording.

It should be understood that in this embodiment of this application, the input unit 940 may include a graphics processing unit (GPU) 941 and a microphone 942. The graphics processing unit 941 processes image data of a static picture or a video that is obtained by an image capture apparatus (for example, a camera) in a video capture mode or an image capture mode. The display unit 960 may include a display panel 961. The display panel 961 may be configured in a form of a liquid crystal display, an organic light-emitting diode display, or the like. The user input unit 970 includes a touch panel 971 and other input devices 972. The touch panel 971 is also referred to as a touchscreen. The touch panel 971 may include two parts: a touch detection apparatus and a touch controller. The other input devices 972 may include but are not limited to a physical keyboard, a functional button (such as a volume control button or a power on/off button), a trackball, a mouse, and a joystick. Details are not described herein. The memory 990 may be configured to store software programs and various data which include but are not limited to an application program 991 and an operating system 992. The processor 901 may integrate an application processor and a modem processor. The application processor mainly processes the operating system, a user interface, an application program, and the like. The modem processor mainly processes wireless communication. It can be understood that the modem processor may alternatively be not integrated in the processor.

An embodiment of this application further provides a readable storage medium, where the readable storage medium stores a program or instructions, and when the program or instructions are executed by a processor, the processes of the foregoing control method embodiments are implemented, with the same technical effects achieved. To avoid repetition, details are not described herein again.

The processor is the processor in the electronic device in the foregoing embodiments. The readable storage medium includes a computer-readable storage medium such as a computer read-only memory (ROM), a random access memory (RAM), a magnetic disk, or an optical disc.

It should be noted that in this specification, the terms "include", "comprise", or any of their variants are intended to cover a non-exclusive inclusion, so that a process, method, article, or apparatus that includes a series of elements includes not only those elements but also other elements that are not expressly listed, or further includes elements inherent to such process, method, article, or apparatus. Without more constraints, an element preceded by "includes a . . . " does not preclude the presence of other identical elements in the process, method, article, or apparatus that includes the element. In addition, it should be noted that the scope of the method and apparatus in the implementations of this application is not limited to functions being performed in the order shown or discussed, but may further include functions being performed at substantially the same time or in a reverse order, depending on the functions involved. For example, the described method may be performed in an order different from the order described, and steps may be added, omitted, or combined. In addition, features described with reference to some examples may be combined in other examples.

According to the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. An electronic device, comprising a first housing, a second housing, a flexible display, a sound emitter, a first sound receiver, a second sound receiver, and a third sound receiver, wherein
   the first housing is connected to the second housing via the flexible display, and the second housing is capable of moving relative to the first housing such that the flexible display switches between a rolled state and an unrolled state;
   the sound emitter is disposed inside the first housing, a first sound outlet hole is provided in a surface of the first housing, and the sound emitter is in communication with the outside via the first sound outlet hole;
   the first sound receiver is disposed inside the second housing, a first sound receiving hole is provided in a surface of the second housing, and the first sound receiver is in communication with the first sound receiving hole; and the second sound receiver and the third sound receiver are both disposed inside the first housing, a second sound receiving hole and a third sound receiving hole are further provided in the surface of the first housing, the second sound receiver is in communication with the outside via the second sound receiving hole, the third sound receiver is in communication with the outside via the third sound receiving hole, and the second sound receiving hole and the third sound receiving hole are respectively located on two sides of the first housing facing away from each other; and
   in a case that the flexible display is in the rolled state, the first housing covers the first sound receiving hole; and in a case that the flexible display is in the unrolled state, the first sound receiving hole is exposed, and the first sound receiver is in communication with the outside via the first sound receiving hole.

2. The electronic device according to claim 1, wherein the first housing is provided with a rolling shaft inside, and one end of the flexible display is rolled around the rolling shaft; and the second housing has a first surface and a second surface, the first surface and the second surface facing away from each other in a direction parallel to the rolling shaft, and the first surface being provided with the first sound receiving hole.

3. The electronic device according to claim 1, wherein the second housing has a third surface, the third surface being provided with the first sound receiving hole; and
   in a case that the flexible display is in the unrolled state, the third surface faces the first housing.

4. The electronic device according to claim 1, wherein the first housing is provided with a rolling shaft inside, and one end of the flexible display is rolled around the rolling shaft; two ends of the first housing in a direction parallel to the rolling shaft are a first end and a second end, and two ends of the second housing in the direction parallel to the rolling shaft are a third end and a fourth end, the first end and the third end being located on a same side, and the second end and the fourth end being located on a same side; and the first sound outlet hole is provided in the first end, and the first sound receiving hole is provided in the third end.

5. The electronic device according to claim 1, wherein the second housing comprises a housing body and a protrusion, the protrusion being disposed at an end of the housing body, the end being provided with the first sound receiving hole, and the protrusion protruding relative to the first sound receiving hole; and
　　in a case that the flexible display is in the unrolled state, the first sound receiving hole is located between the first housing and the protrusion.

6. The electronic device according to claim 1, wherein the electronic device further comprises a first magnetic member and a second magnetic member, the first magnetic member being disposed on the first housing, and the second magnetic member being disposed on the second housing; and in a case that the flexible display is in the rolled state, the first magnetic member is in magnetic attraction with the second magnetic member.

7. A control method, applied to the electronic device according to claim 1, wherein the method comprises:
　　controlling a sound emitter to emit sound; and
　　obtaining a state parameter of a flexible display based on sound reception signals of a first sound receiver and a second sound receiver.

8. The control method according to claim 7, wherein the state parameter comprises unrolling distance, and the obtaining a state parameter of a flexible display based on sound reception signals of a first sound receiver and a second sound receiver specifically comprises:
　　obtaining a current state of the flexible display based on intensity of a first sound reception signal received by the first sound receiver and intensity of a second sound reception signal received by the second sound receiver; and
　　in a case that the current state of the flexible display is an unrolled state, obtaining corresponding unrolling distances based on the intensity of the first sound reception signal and the intensity of the second sound reception signal.

9. The control method according to claim 8, wherein the obtaining corresponding unrolling distances based on the intensity of the first sound reception signal and the intensity of the second sound reception signal specifically comprises:
　　measuring a duration required for the first sound receiver to pick up a sound signal emitted by the sound emitter; and
　　obtaining corresponding unrolling distances based on the duration, the intensity of the first sound reception signal, and the intensity of the second sound reception signal.

10. The control method according to claim 9, wherein the obtaining corresponding unrolling distances based on the duration, the intensity of the first sound reception signal, and the intensity of the second sound reception signal specifically comprises:
　　obtaining an estimated unrolling distance based on the duration;
　　obtaining, based on the estimated unrolling distance, a monotonic interval in which the intensity of the first sound reception signal and the intensity of the second sound reception signal are located; and
　　obtaining, based on the intensity of the first sound reception signal and the intensity of the second sound reception signal, corresponding unrolling distances for the two intensities in the monotonic interval.

11. The control method according to claim 8, wherein the control method further comprises:
　　matching a corresponding directional recording parameter based on the unrolling distance.

12. The control method according to claim 7, wherein the obtaining a state parameter of a flexible display based on sound reception signals of a first sound receiver and a second sound receiver specifically comprises:
　　obtaining a current state of the flexible display based on intensity of a first sound reception signal received by the first sound receiver and intensity of a second sound reception signal received by the second sound receiver; and
　　in a case that the current state of the flexible display is a rolled state, performing operations corresponding to the rolled state.

13. An electronic device, comprising a processor, a memory, and a program or instructions stored in the memory and capable of running on the processor, wherein the program or instructions are executed by the processor to implement steps of the control method according to claim 7, comprising:
　　controlling a sound emitter to emit sound; and
　　obtaining a state parameter of a flexible display based on sound reception signals of a first sound receiver and a second sound receiver.

14. The electronic device according to claim 13, wherein the state parameter comprises unrolling distance, and when obtaining a state parameter of a flexible display based on sound reception signals of a first sound receiver and a second sound receiver, the program or instructions are executed by the processor to implement steps of:
　　obtaining a current state of the flexible display based on intensity of a first sound reception signal received by the first sound receiver and intensity of a second sound reception signal received by the second sound receiver; and
　　in a case that the current state of the flexible display is an unrolled state, obtaining corresponding unrolling distances based on the intensity of the first sound reception signal and the intensity of the second sound reception signal.

15. The electronic device according to claim 14, wherein when obtaining corresponding unrolling distances based on the intensity of the first sound reception signal and the intensity of the second sound reception signal, the program or instructions are executed by the processor to implement steps of:
　　measuring a duration required for the first sound receiver to pick up a sound signal emitted by the sound emitter; and
　　obtaining corresponding unrolling distances based on the duration, the intensity of the first sound reception signal, and the intensity of the second sound reception signal.

16. The electronic device according to claim 15, wherein when obtaining corresponding unrolling distances based on the duration, the intensity of the first sound reception signal, and the intensity of the second sound reception signal, the program or instructions are executed by the processor to implement steps of:
　　obtaining an estimated unrolling distance based on the duration;
　　obtaining, based on the estimated unrolling distance, a monotonic interval in which the intensity of the first sound reception signal and the intensity of the second sound reception signal are located; and
　　obtaining, based on the intensity of the first sound reception signal and the intensity of the second sound reception signal, corresponding unrolling distances for the two intensities in the monotonic interval.

17. The electronic device according to claim 14, wherein the program or instructions are executed by the processor to further implement steps of:

matching a corresponding directional recording parameter based on the unrolling distance.

18. The electronic device according to claim 13, wherein when obtaining a state parameter of a flexible display based on sound reception signals of a first sound receiver and a second sound receiver, the program or instructions are executed by the processor to implement steps of:

obtaining a current state of the flexible display based on intensity of a first sound reception signal received by the first sound receiver and intensity of a second sound reception signal received by the second sound receiver; and in a case that the current state of the flexible display is a rolled state, performing operations corresponding to the rolled state.

19. A non-transitory readable storage medium, wherein the non-transitory readable storage medium stores a program or instructions, and the program or instructions are executed by a processor to implement steps of the control method according to claim 7, comprising:

controlling a sound emitter to emit sound; and obtaining a state parameter of a flexible display based on sound reception signals of a first sound receiver and a second sound receiver.

20. The non-transitory readable storage medium according to claim 19, wherein the state parameter comprises unrolling distance, and when obtaining a state parameter of a flexible display based on sound reception signals of a first sound receiver and a second sound receiver, the program or instructions are executed by the processor to implement steps of:

obtaining a current state of the flexible display based on intensity of a first sound reception signal received by the first sound receiver and intensity of a second sound reception signal received by the second sound receiver; and in a case that the current state of the flexible display is an unrolled state, obtaining corresponding unrolling distances based on the intensity of the first sound reception signal and the intensity of the second sound reception signal.

\* \* \* \* \*